United States Patent
Lee et al.

(10) Patent No.: US 8,117,006 B2
(45) Date of Patent: Feb. 14, 2012

(54) METHOD FOR MEASURING POSITION OF PORTABLE TERMINAL AND INDOOR ILLUMINATING APPARATUS FOR THE SAME

(75) Inventors: Kyung-Woo Lee, Yongin-si (KR); Yun-Je Oh, Suwon-si (KR); Dae-Kwang Jung, Suwon-si (KR); Jeong-Seok Choi, Yongin-si (KR); Hong-Seok Shin, Yongin-si (KR); Sung-Bum Park, Suwon-si (KR)

(73) Assignee: Samsung Electronics Co., Ltd (KR)

(*) Notice: Subject to any disclaimer, the term of this patent is extended or adjusted under 35 U.S.C. 154(b) by 201 days.

(21) Appl. No.: 12/687,530

(22) Filed: Jan. 14, 2010

(65) Prior Publication Data
US 2010/0179786 A1    Jul. 15, 2010

(30) Foreign Application Priority Data
Jan. 14, 2009   (KR) .................... 10-2009-0003035

(51) Int. Cl.
*G01C 3/00*   (2006.01)
(52) U.S. Cl. ................................................ 702/150
(58) Field of Classification Search ............ 702/150
See application file for complete search history.

(56) References Cited

U.S. PATENT DOCUMENTS

| | | | |
|---|---|---|---|
| 7,499,829 B2 | 3/2009 | Lee et al. | |
| 7,728,893 B2* | 6/2010 | Kagawa et al. | 348/302 |
| 7,852,318 B2 | 12/2010 | Altman | |
| 2005/0243077 A1* | 11/2005 | Chung et al. | 345/204 |
| 2007/0109240 A1* | 5/2007 | Jung | 345/87 |
| 2007/0211013 A1* | 9/2007 | Uehara et al. | 345/102 |
| 2008/0273005 A1* | 11/2008 | Chen et al. | 345/102 |
| 2008/0297615 A1* | 12/2008 | Kagawa et al. | 348/222.1 |
| 2009/0185802 A1 | 7/2009 | Choi et al. | |

FOREIGN PATENT DOCUMENTS

| | | |
|---|---|---|
| KR | 1020050007210 | 1/2005 |
| KR | 1020070038456 | 4/2007 |
| KR | 1020090005794 | 1/2009 |

* cited by examiner

*Primary Examiner* — Cindy H Khuu
(74) *Attorney, Agent, or Firm* — The Farrell Law Firm, P.C.

(57) ABSTRACT

Provided is a method of measuring the position of a portable terminal, comprising detecting indoor illuminating light, and outputting an electric signal corresponding to the detected indoor illuminating light, obtaining a plurality of data frames from the output electrical signal, and calculating a position of the portable terminal based on information regarding the position of a corresponding reference light source included in each data frame and an identifier corresponding to the reference light source included in said each frame and a reception time of said each data frame.

7 Claims, 5 Drawing Sheets

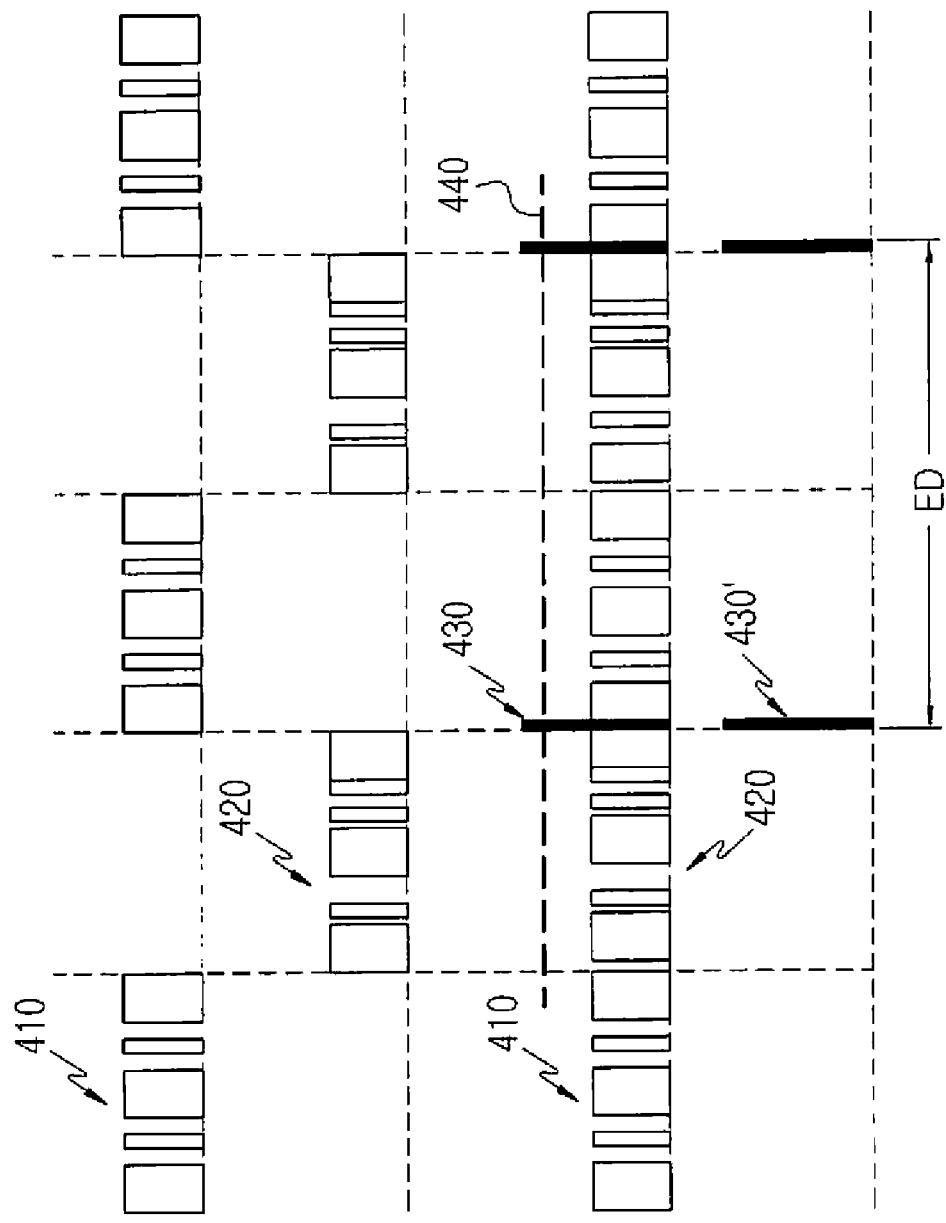

METHOD FOR MEASURING POSITION OF PORTABLE TERMINAL AND INDOOR ILLUMINATING APPARATUS FOR THE SAME

PRIORITY

This application claims the priority under 35 U.S.C. §119(a) to an application entitled "Method for Measuring Position of Portable Terminal and Indoor Illuminating Apparatus For The Same" filed in the Korean Industrial Property Office on Jan. 14, 2009 and assigned Serial No. 10-2009-0003035, the contents of which are incorporated herein by reference.

BACKGROUND OF THE INVENTION

1. Field of the Invention

The present invention relates generally to a position measurement method for a portable terminal, and more particularly to a position measurement method for a portable terminal using an indoor illuminating apparatus.

2. Description of the Related Art

Conventional methods of measuring a position of an indoor object include methods using RFID (Radio Frequency IDentification).

A conventional RFID position measurement method includes use of an RFID tag that is affixed to an object, stores IDentification (ID) information, and RF transmits the ID information, and further includes use of a number of readers for receiving ID information corresponding to each RFID tag and transmitting the ID information to a server.

Each of the readers Radio-Frequency (RF) transmits an RFID tag detecting signal. The RFID tag receiving the RFID tag detecting signal RF transmits its own ID information. The corresponding reader that has received the ID information transmits the ID information to a server connected thereto. The server determines that an object affixed to the RFID tag is located in the detection range of the reader that has transmitted the ID information to the server.

A conventional RFID using position measurement method requires installation of a large number of readers due to a limited detection range of each RFID reader, resulting a heavy cost burden.

Also, conventional RFID positioning measurements method can only determine whether an object is located in the detection range of a specific reader, but the conventional method does not recognize a definite position of an object.

SUMMARY OF THE INVENTION

Accordingly, an object of the present invention is to provide an apparatus and method having a low-cost and simple construction, as well as enabling precise measurement of a position of a portable terminal.

A position measurement method of a portable terminal according to an aspect of the present invention includes detecting indoor illuminating light and outputting an electric signal corresponding to the detected indoor illuminating light; obtaining a plurality of data frames from the output electrical signal; and calculating a position of the portable terminal based on information regarding a position of a corresponding reference light source included in each data frame, an identifier corresponding to the corresponding reference light source included in said each data frame, and a reception time of said each data frame.

An indoor illumination apparatus for measuring the position of a portable terminal according to another aspect of the present invention includes a plurality of light sources for outputting light according to separately input driving signals; and a driving unit for driving the plurality of light sources sequentially or periodically, wherein the driving unit applies a corresponding data frame containing an identifier and position information corresponding to each of reference light sources among the plurality of light sources, such that the data frames enable the portable terminal to calculate the position of the portable terminal.

BRIEF DESCRIPTION OF THE DRAWINGS

The above and other aspects, features and advantages of the present invention will be more apparent from the following detailed description taken in conjunction with the accompanying drawings, in which:

FIG. 6 is a diagram describing an edge detection method according to an embodiment of the present invention.

DETAILED DESCRIPTION OF EMBODIMENTS OF THE PRESENT INVENTION

Hereinafter, embodiments of the present invention will be described in detail with reference to the accompanying drawings. In the following description of the present invention, a detailed description of known technologies incorporated herein will be omitted when it may make the subject matter of the present invention rather unclear.

Figure 1:
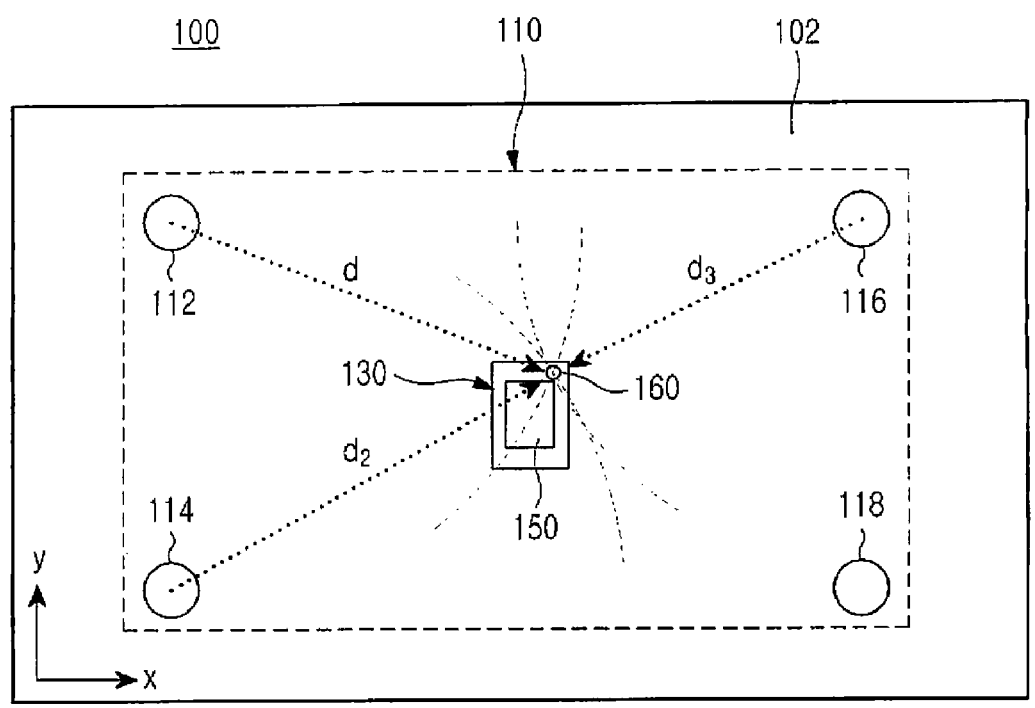
FIG. 1 is a view indicating a position measurement system according to an embodiment of the present invention.
Figure 2:
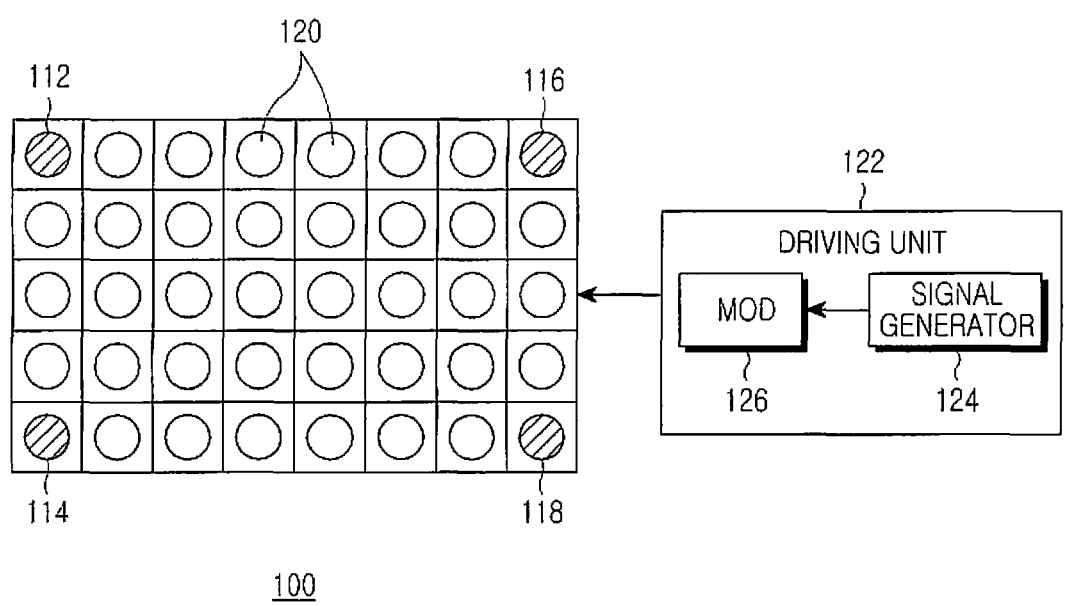
FIG. 2 is a plain view of an illumination apparatus shown in FIG. 1.
Figure 3:
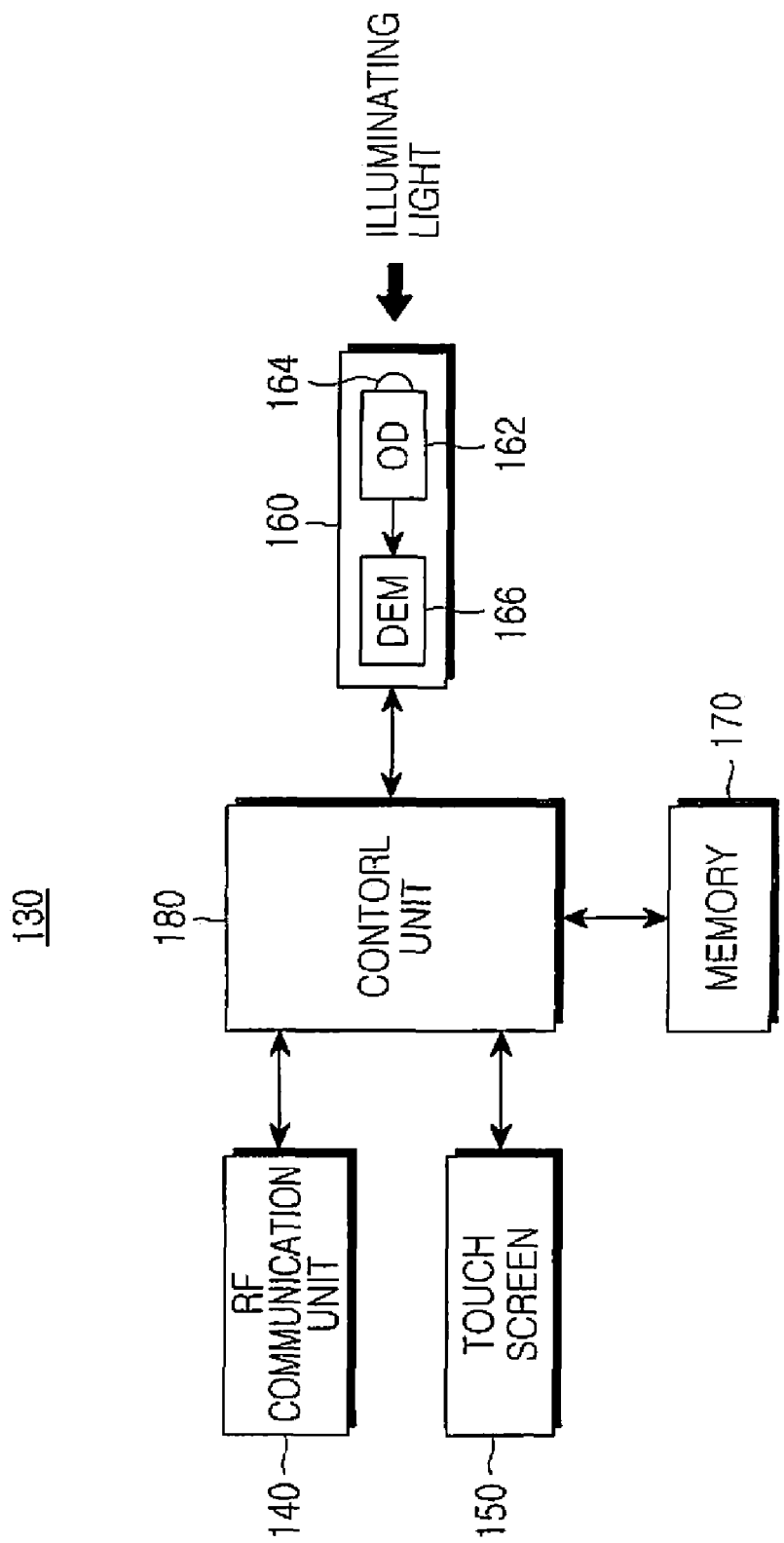
FIG. 3 is a diagram indicating the schematic construction of a portable terminal shown in FIG. 1.

FIG. 1 is a view indicating a position measurement system according to an embodiment of the present invention, FIG. 2 is a plain view of an illumination apparatus shown in FIG. 1, and FIG. 3 is a diagram indicating the schematic construction of a portable terminal shown in FIG. 1.

The position measurement system 100 is installed in an indoor space 102, and includes an illumination apparatus 110 and a portable terminal 130.

The illumination apparatus 110 performs an indoor illumination function, and is installed at the upper side (e.g., a ceiling) of the indoor space 102. The illumination apparatus 110 includes a plurality of light sources 112 through 120 disposed in the form of a lattice or a matrix form. As shown in FIG. 2, according to the present example, the light sources 112 through 120 are disposed in the form of a 5×8 matrix. The $1^{st}$ through $3^{rd}$ basis light sources 112, 114, and 116 are located in three corners of an illumination apparatus 110, output illumination light and modulate the light into a corresponding data frame at the same time. The remaining light sources 120 are used simply for an illumination purpose. Optionally, the $4^{th}$ basis light source 118 may be located in the remaining corner of the illumination apparatus 110.

Figure 4:
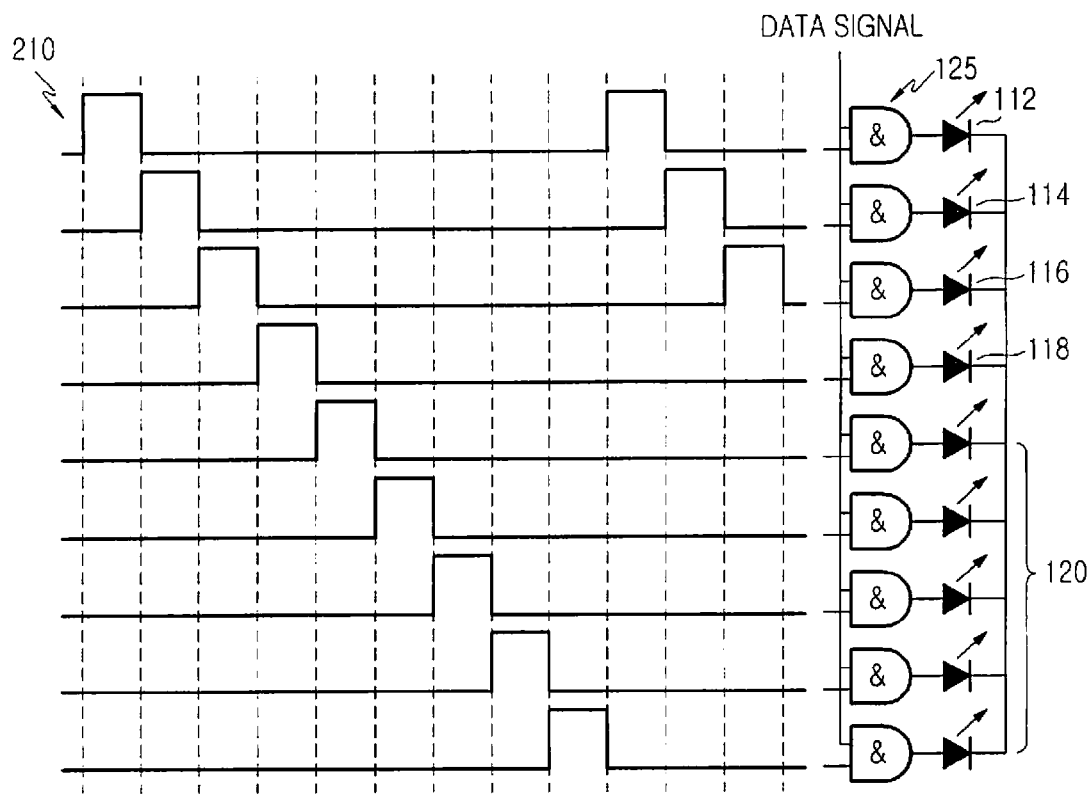
FIG. 4 is a circuit diagram indicating the main construction of an illumination apparatus shown in FIG. 1.

FIG. 4 is a circuit diagram indicating the main construction of the illumination apparatus 110. In FIG. 2 and FIG. 4, the illumination apparatus 110 includes a plurality of light sources 112 through 120 outputting light according to separately input driving signals 210, and a driving unit 122 for driving the light sources 112 through 120 sequentially and/or periodically. Also, the driving unit 122 includes a signal generator 124 for generating driving signals 210 for turning on/off the light sources 112 through 120 sequentially and/or periodically and data frames for modulating the corresponding driving signals 210, and a modulator (MOD, 126) for modulating the corresponding driving signal 210 with the corresponding data frame. In this embodiment, the modulator 126 may be realized as a plurality of AND gates 125.

Each of the light sources 112 through 120 is connected to the output terminal of a corresponding AND gate 125, and the first input terminal of the AND gate 125 receives an On/Off driving signal 210 (for example, the driving signal may use a '0' bit and a '1' bit to indicate "OFF" and "ON," respectively), and the second input terminal of the AND gate 125 receives a data signal including one of a data frame and an ON signal (i.e., the '1' bit signal). A driving signal 210, provided as input to each light source 112 through 120, is a pulse signal having a regular period, and the period is constant for all light sources 112 through 120. Also, during one period (or a cycle) comprised of a plurality of time slots assigned one-to-one to the light sources 112 through 120, the driving signals 210 are input to the light sources 112 to 120 sequentially and/or continuously, so that the light sources 112 through 120 can output illuminating-purpose light sequentially and/or consecutively.

The method of driving the light sources 112 through 120 of the illumination apparatus 110 sequentially and periodically is referred to as a Pulse Width Modulation (PWM) mode, and this mode is generally used to decrease heating and power consumption in a Light Emitting Diode (LED) illumination apparatus. A range of PWM modulation speed is generally from about 10 through 100 kHz (although other ranges may be used in accordance with the present invention), and such a slow modulation speed causes the pulse width of a driving signal 210 to be widened, so that the driving signal 210 can be modulated with a data frame having a high frequency.

Figure 5:
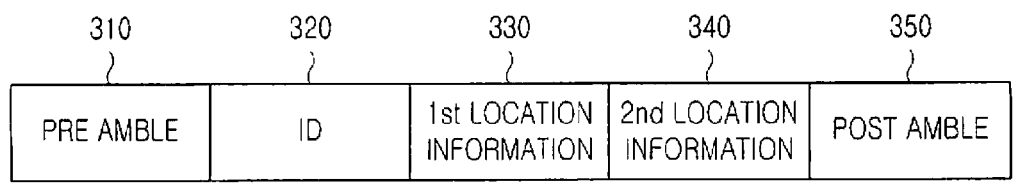
FIG. 5 is a diagram indicating the structure of a data frame according to an embodiment of the present invention.

FIG. 5 is a diagram indicating the structure of a data frame according to an embodiment of the present invention. The data frame 300 includes a pre-amble field 310, an ID field 320, a first position information field 330, a second position information field 340, and a pre-amble field 350. The pre-amble field 310 and the post-amble field 350 are each comprised of a '1' bit string, an identifier for identifying a corresponding light source is included in the ID field 320, position information of the illumination apparatus 110 is included in the first position information field 330, and position information of the corresponding light source is included in the second position information field. The pre-amble field 310 and the post-amble field 350 are provided for preventing data errors caused by superposition between adjoining data frames regarding the ID field 320, the first position information field 330, and the second position information 340. The error prevention is achieved by inserting the pre-amble and post-amble fields 310 and 350 between adjoining data frames, and each of the pre-amble and post-amble fields 310 and 350 may include an arbitrary bit string.

Referring to FIG. 3, a portable terminal 130 according to an embodiment of the present invention includes an RF communication unit 140, a touch screen 150, an optic receiving unit 160, a memory 170 and a control unit 180. The portable terminal 130 may further include a camera, a speaker, a microphone, etc.

The RF communication unit 140 receives an RF downward signal over the air by using an antenna, and outputs downward data obtained by demodulating the RF downward signal to the control unit 180. Also, the RF communication unit 140 generates an RF upward signal by modulating an upward data input from the control unit 180, and the RF communication unit 140 transmits the generated RF upward signal to the air by using an antenna. The aforementioned modulation and demodulation may be performed according to a Code Division Multiple Access (CDMA) mode, a Frequency Division Multiplexing (FDM) mode, a Time Division Multiplexing (TDM) mode, etc.

The touch screen 150 displays images according to the control of the control unit 180. When a user input means such as a finger or a stylus pen contacts a surface of the touch screen 150, the touch screen 150 generates a key input interrupt and outputs user input information including input coordinates and an input state to the control unit 180 according to the control of the control unit 180.

The optic receiving unit 160 includes an optical system 164, an Optical Detector (OD) 162 and a DEModulator (DEM) 166. The optical system 164 receives illuminating light from free space and focuses the illuminating light. According to an embodiment of the present invention, the optical system 164 may include a single lens. The optical detector 162 outputs an electric signal obtained by photoelectric-converting the illuminating light input and focused by the optical system 164. The demodulator 166 receives the electric signal from the optical detector 162, and then the demodulator 166 demodulates and outputs data frames from the electric signal.

The memory 170 stores images for providing various functions of applications and the related Graphical User Interface (GUI), databases relevant to user information, documents, background images (for example, a menu screen and a standby screen), any operational programs necessary for driving the portable terminal 130, etc.

The control unit 180 performs program operations according to user input information, including performing program operations such as text output and performing the selection or movement of items on the screen. For example, when a message transmission application is running and a user clicks on a soft button 'A' in a character table displayed on the touch screen 150, the message transmission application performs a program operation corresponding to such a key input event, such as displaying a text 'A' in a message input window.

The control unit 180 also calculates the position of the portable terminal 130 based on the position of a corresponding reference light source among the first through the third reference light sources 112 to 116 obtained from identifiers and position information carried on each data frame, and based on the reception time of the first through the third data frames.

Referring to FIG. 1, a method of calculating the position coordinate of the portable terminal 130 using triangulation is described as follows. As an example, it is assumed that the illumination apparatus 110 and the portable terminal 130 are synchronized with each other.

On x-y plane coordinates, the coordinates of the portable terminal 130 and the first through the third light sources 112 through 116 each are set as $\{x_t, y_t\}$, $\{x_1, y_1\}$, $\{x_2, y_2\}$ and $\{x_3, y_3\}$, and the separation distances of the first through the third reference light sources 112 through 116 with reference to the portable terminal 130 each are set as $d_1$, $d_2$ and $d_3$.

The separation distances of $d_1$, $d_2$ and $d_3$ are determined as Equation (1) below by Pythagorean theorem.

$$d_1^2 = (x_1-x_1)^2 + (y_1-y_1)^2$$
$$d_2^2 = (x_1-x_2)^2 + (y_1-y_2)^2$$
$$d_3^2 = (x_1-x_3)^2 + (y_1-y_3)^2 \hspace{2em} \text{Equation (1)}$$

Thus, when the separation distances of $d_1$, $d_2$ and $d_3$ are known, the coordinate of the portable terminal 130 can be calculated, and the separation distances are derived from the reception time of the first through the third data frames. That is, a difference between a time that the illumination apparatus 110 transmits each data frame and a time that the portable terminal 130 receives the data frame (i.e., a reception delay time) is converted into a distance, the conversion formula is expressed as Equation (2) below.

$$d_i = c \cdot t_i \quad \text{Equation (2)}$$

In Equation (2) above, i indicates a natural number less than 4, c indicates the velocity of light in a vacuum, and $t_i$ indicates the reception delay time of $i^{th}$ data frame.

When a difference between the start time (or a transmit time) or the end time of the corresponding time slot for one data frame and the reception start time or the reception end time of the data frame (i.e., the reception delay time), is so short that it becomes difficult to calculate the reception delay time, an edge detection mode can be applied as below.

FIG. 6 is a diagram describing an edge detection method according to the present invention. For better understandings, the first and the second data frames will be taken into consideration.

Subfigure (a) of FIG. 6 indicates a first data frame 410 transmitted from the illumination apparatus 110, and the first data frame 410 is transmitted along the temporal axis periodically.

Subfigure (b) of FIG. 6 indicates a second data frame 420 transmitted from the illumination apparatus 110, and the second data frame 420 is transmitted along the temporal axis periodically. The second data frame 420 is transmitted at the transmission end time of the first data frame 410.

Subfigure (c) of FIG. 6 indicates the first and the second data frames received by the portable terminal 130 along the temporal axis. As shown in the figure, the second data frame 420 is received later than the reception end time of the first data frame 410 as the portable terminal 130 is located closer to the first reference light source 112 than the second reference light source 114. Therefore, the post amble of the first data frame 410 and the pre amble of the second data frame 420 are superposed upon each other, generating periodic edge pulses 430.

Subfigure (d) of FIG. 6 indicates pulses 430' that are extracted from the edge signal 430 portions over the threshold level 440 shown in (c) of FIG. 6 and amplified using, for example, a limiting amplifier, so that the pulses 430' are limitedly amplified. By subtracting the time corresponding to 2 time slots from a time (ED) between the start time and the end time of such adjoining two limitedly amplified pulses 430', a difference between the reception end time of the first data frame 410 and the reception start time of the second data frame 420 (i.e., the reception delay time of the second data frame 420 with reference to the reception end time of the first data frame 410) can be derived. The difference of the reception times can be converted as the distance difference of the first and the second reference light sources 112, 114 with reference to the portable terminal 130. By triangulation based on such a calculated distance difference, the position of the portable terminal 130 can be calculated.

The position measurement method of a portable terminal according to the present invention can measure the position of the portable terminal through triangulation using an indoor illumination apparatus without additional components. Therefore, the position measurement method according to the present invention can be realized at a low cost.

While the invention has been shown and described with reference to certain embodiments thereof, it will be understood by those skilled in the art that various changes in form and details may be made therein without departing from the spirit and scope of the invention as defined by the appended claims.

What is claimed is:

1. A position measurement method of a portable terminal, comprising the steps of:
   detecting, by an optical detector, indoor illuminating light and outputting an electric signal corresponding to the detected indoor illuminating light;
   obtaining a plurality of data frames from the output electric signal; and
   calculating a position of the portable terminal based on information regarding a position of a corresponding reference light source included in each data frame and an identifier corresponding to the corresponding reference light source included in said each data frame, and a reception time of said each data frame.

2. The position measurement method of claim 1, wherein the plurality of data frames comprise a first data frame, a second data frame, and a third data frame,
   wherein the first, second, and third data frames are sequentially output from a first reference light source, a second reference light source and a third reference light source, respectively, and
   wherein each of the first, second, and third data frames is periodically output from a corresponding reference light source.

3. The position measurement method of claim 1, wherein calculating the position of the portable terminal comprises:
   obtaining the identifier and the position information of the corresponding reference light source from each data frame;
   calculating, for each data frame, a distance between the corresponding reference light source and the portable terminal according to a reception delay time of the data frame; and
   calculating the position of the portable terminal by triangulation based on each calculated distance.

4. The position measurement method of claim 1, wherein calculating the position of the portable terminal comprises:
   obtaining the identifier and the position information of the corresponding reference light source from each data frame;
   obtaining edge signals according to a superposition of a pair of adjoining data frames among the data frames;
   calculating, for each pair of adjoining data frames, a difference between distances from each reference light source corresponding to the pair of adjoining data frames to the portable terminal, according to a temporal interval of edge signals corresponding to the pair of adjoining data frames; and
   calculating the position of the portable terminal by triangulation based on the calculated distance differences.

5. An indoor illumination apparatus for measuring the position of a portable terminal comprising:
   a plurality of light sources for outputting light according to separately input driving signals; and
   a driving unit for driving the plurality of light sources sequentially or periodically,
   wherein the driving unit applies a corresponding data frame containing an identifier and position information corresponding to each of reference light sources among the plurality of light sources, such that the data frames enable the portable terminal to calculate the position of the portable terminal.

6. The indoor illumination apparatus of claim 5, wherein the plurality of light sources comprise a first reference light source, a second reference light source, and a third reference light source,
- wherein the first, second, and third reference light sources separately output a first data frame, a second data frame and a third data frame, respectively, and
- wherein each of the first, second, and third data frames is periodically output from its corresponding reference light source.

7. The indoor illumination apparatus of claim 5, wherein the driving unit comprises:
- a signal generator for generating driving signals for turning the reference light sources on/off sequentially or periodically, and for generating data frames for modulating the driving signals; and
- a modulator for modulating each driving signal with a corresponding data frame.

* * * * *